(12) United States Patent
Kobayashi

(10) Patent No.: US 6,266,255 B1
(45) Date of Patent: Jul. 24, 2001

(54) EFFICIENT POWER SUPPLY WITH SMALL TRANSFORMERS

(75) Inventor: Junichi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/592,490

(22) Filed: Jun. 12, 2000

(30) Foreign Application Priority Data

Jun. 15, 1999 (JP) .................................................. 11-168560

(51) Int. Cl.$^7$ .................................................. H02M 3/335
(52) U.S. Cl. .................................................. 363/25; 363/134
(58) Field of Search ................................. 363/24, 25, 26, 363/133, 134

(56) References Cited

U.S. PATENT DOCUMENTS

| | | | |
|---|---|---|---|
| 4,783,795 | * | 11/1988 | Yahata .................................. 378/105 |
| 5,181,160 | * | 1/1993 | Okamoto et al. ....................... 363/97 |
| 5,414,609 | * | 5/1995 | Levran et al. ......................... 363/17 |
| 5,488,554 | * | 1/1996 | Green .................................... 363/25 |

FOREIGN PATENT DOCUMENTS

| | | | |
|---|---|---|---|
| 57-38595 | 3/1982 | (JP) | .................................. H05B/4/26 |
| 57-110079 | 7/1982 | (JP) | .................................. H02M/7/48 |
| 59/11775 | 1/1984 | (JP) | .................................. H02M/3/335 |
| 8-265085 | 10/1996 | (JP) | .................................. H03H/7/075 |
| 9-233698 | 9/1997 | (JP) | .................................. H02J/1/00 |

* cited by examiner

*Primary Examiner*—Adolf Daneke Berhane
(74) *Attorney, Agent, or Firm*—Hayes, Soloway, Hennessey, Grossman & Hage, PC

(57) ABSTRACT

A power supply apparatus is disclosed, that comprises a DC power supply, a plurality of switch means for converting the output voltage of the DC power supply into an AC voltage, a transformer tap-connected to the DC power supply, a capacitor for charging/discharging an output current of the DC power supply, and a choke coil for suppressing the fluctuation of the output current of the DC power supply or the fluctuation of the current value of a discharge current of the capacitor.

4 Claims, 5 Drawing Sheets

FIG. 5A
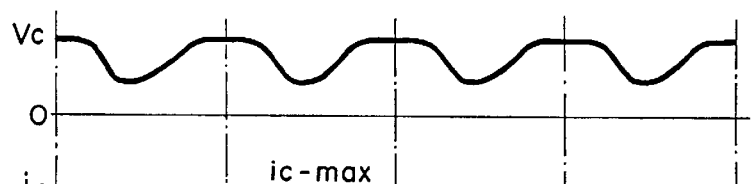
FIG. 5B
FIG. 5C
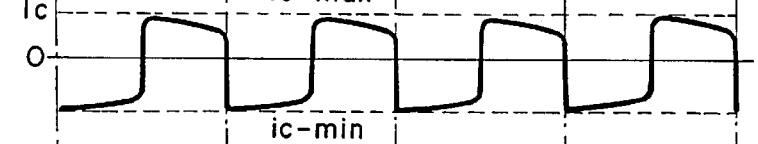
FIG. 5D
FIG. 5E
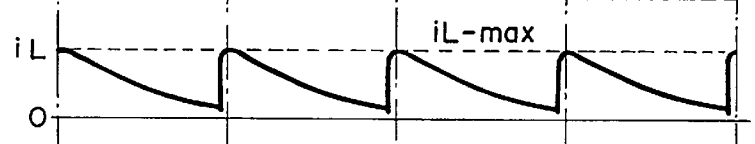
FIG. 5F
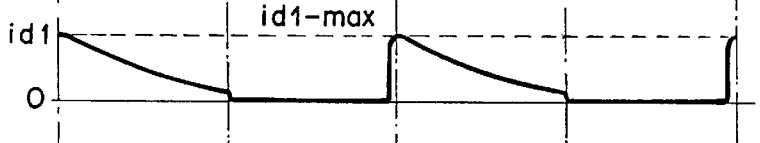
FIG. 5G
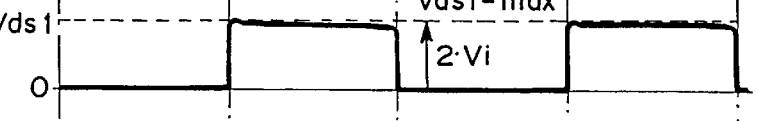
FIG. 5H
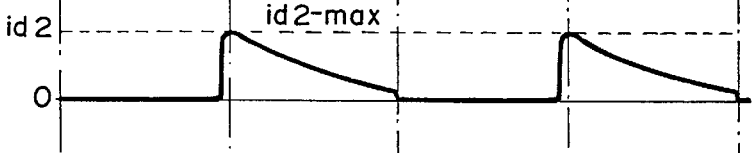
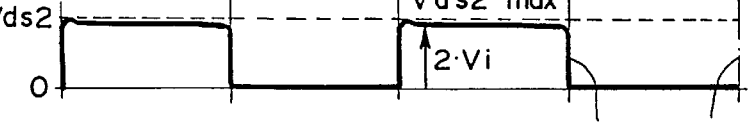
ON/OFF SWITCHING

EFFICIENT POWER SUPPLY WITH SMALL TRANSFORMERS

BACKGROUND OF THE INVENTION

1. Field of the Invention

The present invention relates to a power supply apparatus having a transformer tap-connected to a DC power supply, which is connected at both ends of the primary side to a plurality of switching means for converting a DC voltage into a AC voltage, and output an AC voltage induced to the secondary side.

2. Description of the Related Art

FIG. 1 is a block diagram showing the structure of a conventional power supply apparatus for a traveling wave tube. As shown in FIG. 1, the conventional power supply apparatus comprises DC power supply 1, input filter 2, voltage stabilizing circuit 3, and step-up transformer 8. The DC power supply 1 outputs a DC voltage of Ei. The input filter 2 eliminates noise from the DC voltage supplied from the DC power supply 1. The voltage stabilizing circuit 3 primarily stabilizes the voltage received from the input filter 2. The step-up transformer 8 receives the DC voltage that is output from the voltage stabilizing circuit 3 at a center tap of the primary side thereof.

Switching devices 6 and 7 are respectively connected at each end of the primary side of the step-up transformer 8. The switching devices 6 and 7 turn on and off an output voltage of the step-up transformer 8 so as to generate an AC voltage from a DC voltage. A rectifying circuit 9 and a traveling wave tube 10 are disposed at the secondary side of the step-up transformer 8. The rectifying circuit 9 rectifies an AC voltage induced on the secondary side of the step-up transformer 8.

The voltage stabilizing circuit 3 uses a boost regulator or a back regulator. The boost regulator compensates the voltage fluctuation of the DC power supply 1 and raises the DC voltage with a predetermined ratio of transformation. The back regulator compensates the voltage fluctuation of the DC power supply 1 and lowers the DC voltage with a predetermined ratio of transformation. Each of the switching devices 6 and 7 is composed of a transistor such as a MOSFET, a bipolar transistor and driven by an external driving circuit (not shown).

In the step-up transformer 8, a first part of a primary side coil, a primary side coil, and a second part of the primary side coil are successively wound around a core. Thus, the degree of coupling between a primary side and a primary side is improved and thereby the leakage inductance is reduced. The rectifying circuit 9 may be a full-wave rectifying circuit or a half-wave rectifying circuit.

FIGS. 2A, 2B, 2C, 2D, 2E, and 2F are time charts showing waveforms of signals of individual portions of the conventional power supply apparatus for the traveling wave tube. With reference to FIGS. 2A to 2F, the operation of the conventional power supply apparatus for the traveling wave tube. In FIGS. 2A to 2F, vertical lines represent on/off switching timings of the switching devices 6 and 7. The output voltage signal of the DC power supply 1 is supplied to the input filter 2. The input filter 2 eliminates noise from the voltage signal. The noise-free voltage signal is supplied to the stabilizing circuit 3.

The stabilizing circuit 3 primarily stabilizes the input DC voltage and outputs a stabilized voltage. As shown in FIG. 2A, the output DC voltage Vi lowers between timing of turning on and timing of turning off of the switching devices 6 and 7. This is because a current I shown in FIG. 2B flows through the step-up transformer 8. The current I varies corresponding to the power consumption of the traveling wave tube 10.

The current I is supplied to a center tap of the step-up transformer 8. When the switching device 6 is turned on and the switching device 7 is turned off, a current id1 as shown in FIG. 2C flows through the switching device 6 on the primary side of the step-up transformer 8. Whenever the switching devices 6 and 7 are turned on or off, the level of a voltage Vds1 applied between the terminals of the switching device 6 becomes High or Low, respectively. The maximum values of the voltage Vds1 is 2Vi as shown in FIG. 2D.

On the other hand, when the switching device 6 is turned off and the switching device 7 is turned on, a current id2 as shown in FIG. 2E flows through the switching device 7. Whenever the switching devices 6 and 7 are turned on and off, the level of a voltage Vds2 applied between the terminals of the switching device 7 becomes L and H, respectively, as shown in FIG. 2D. The maximum value of the voltage Vds2 is 2Vi as shown in FIG. 2F.

The currents id1 and id2 that flow through the switching devices 6 and 7 return to the DC power supply 1 through the stabilizing circuit 3 and the input filter 2. A voltage that is induced on the secondary side of the step-up transformer 8 is input to the rectifying circuit 9. The switching operations of the switching devices 6 and 7 generate an AC voltage. For that reason, an output AC voltage on the secondary side of the step-up transformer 8 is supplied to the rectifying circuit 9. The rectifying circuit 9 rectifies the induced voltage. The rectified voltage is applied to the traveling wave tube 10. With the rectified voltage, the traveling wave tube 10 is driven.

In recent years, the requirement of the size reduction of the power supply apparatus is becoming strong. In particular, the size reduction of the step-up transformer that occupies a relatively large space of the power supply apparatus is being required. However, to reduce the size of the step-up transformer, it is necessary to decrease the winding volume of coils and so forth. Thus, the step-up transformer cannot be fabricated in the conventional method. In addition, when the size of the booting transformer is reduced, the leakage inductance may increase. When the leakage inductance increases, the input current I of the step-up transformer may fluctuate.

FIGS. 3A, 3B, and 3C are time charts showing current values of currents id1 and id2 supplied to the switching devices 6 and 7 in the case that the input current I fluctuates. FIG. 3A shows the input current I. FIGS. 3B and 3C show the current values of the current id1 and id2, respectively. As shown in FIG. 3A, when the input current I fluctuates, the current values of the currents id1 and id2 become different. This situation causes switching noise to increase and the switching devices to damage. In addition, when the current values of the currents id1 and id2 are different, the copper loss takes place in the step-up transformer. Thus, the efficiency of the power supply apparatus may deteriorate.

SUMMARY OF THE INVENTION

An object of the present invention is to provide a power supply apparatus having a small step-up transformer that allows current values of currents that flow through individual switching devices to be the same.

Another object of the present invention is to provide a power supply apparatus having a small step-up transformer that allows switching noise not to increase and switching devices not to damage.

The present invention is a power supply apparatus, comprising a DC power supply; a plurality of switch means for converting the output voltage of the DC power supply into an AC voltage; a transformer tap-connected to the DC power supply, a primary side of the transformer being connected to the switch means, an AC voltage induced being output to a secondary side of the transformer; charging/discharging means for charging/discharging an output current of the DC power supply, the charging/discharging means being connected in parallel to the DC power supply; and fluctuation suppressing means for suppressing the fluctuation of the output current of the DC power supply or the fluctuation of the current value of a discharge current of the charging/discharging means, the fluctuation suppressing means being connected in series to the DC power supply.

In other words, according to the present invention, an LC circuit is disposed on the primary side of the transformer. The LC circuit allows currents that flow at taps of the step-up transformer to smoothen. Thus, the current values of the currents that flow through the switching devices become the same.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 5A, 5B, 5C, 5D, 5E, 5F, 5G, and 5H are time charts showing waveforms of signals of individual portions of the power supply apparatus shown in FIG. 4.

DESCRIPTION OF PREFERRED EMBODIMENT

Next, with reference to the accompanying drawings, an embodiment of the present invention will be described.

Figure 1:
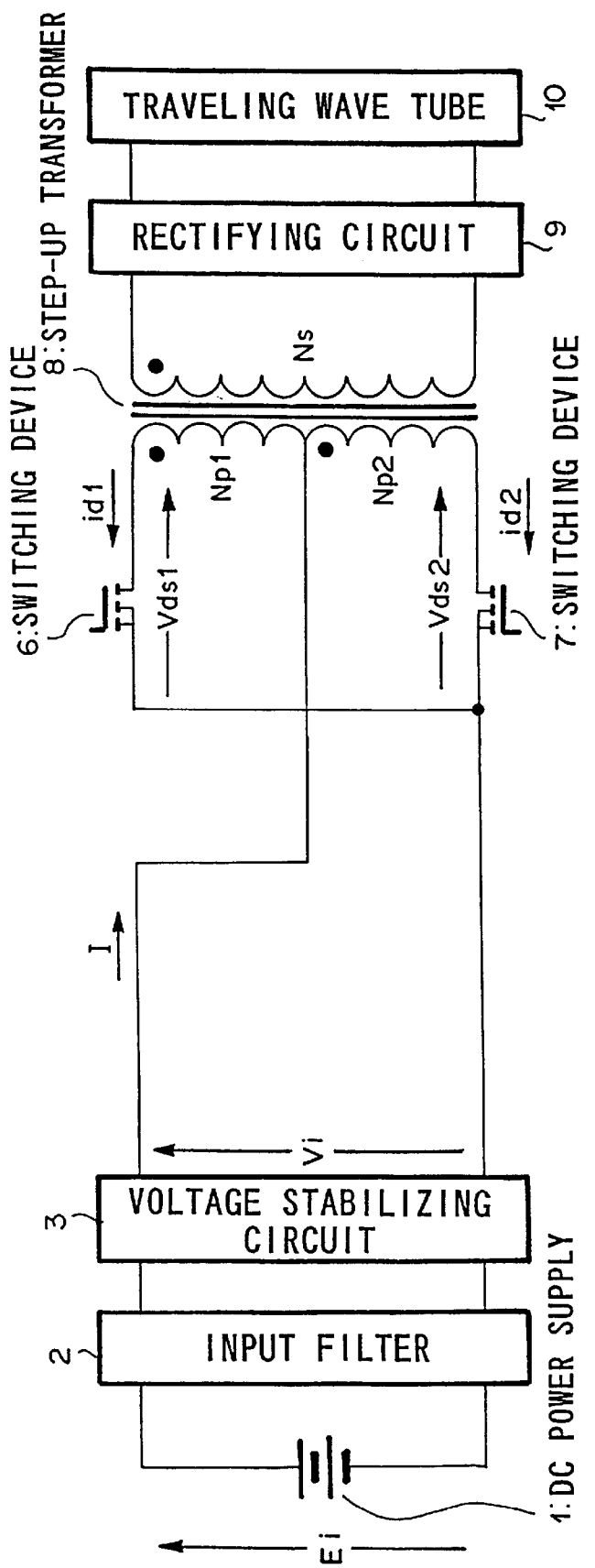
FIG. 1. is a bock diagram showing the structure of a conventional power supply apparatus for a traveling wave tube.
Figure 4:
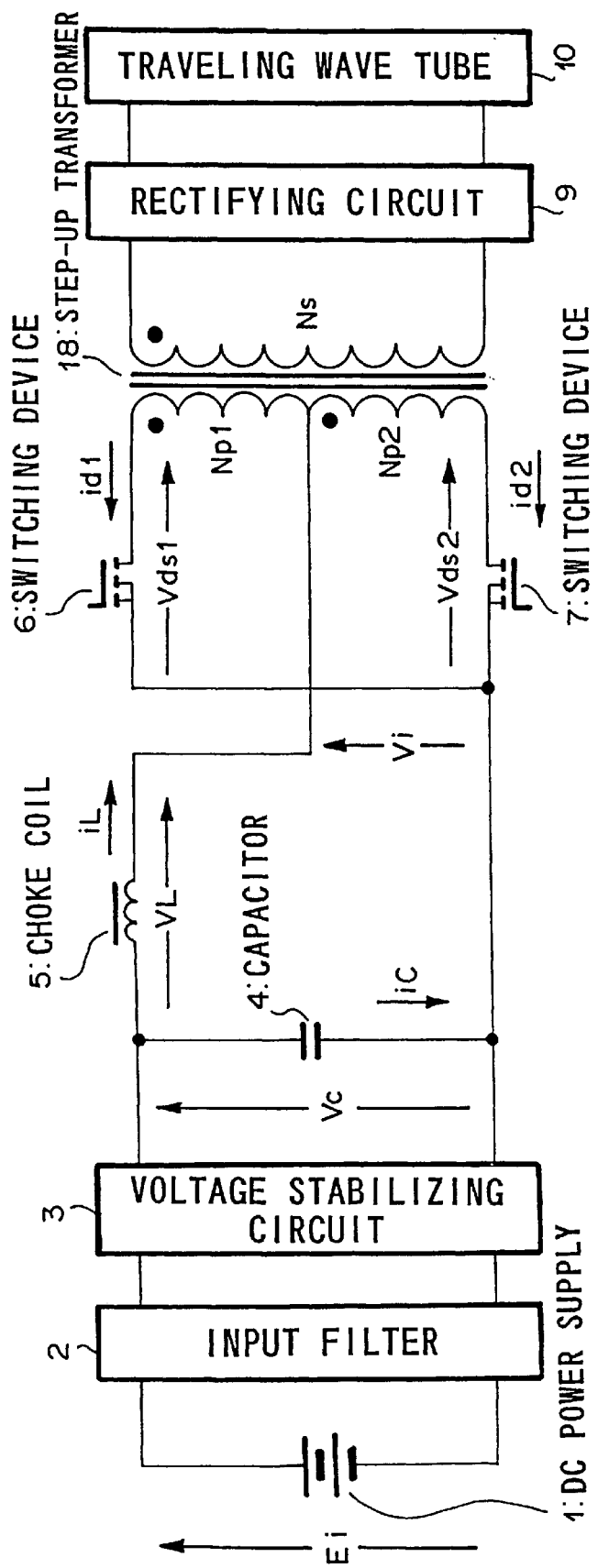
FIG. 4 is a block diagram showing the structure of a power supply apparatus for a traveling wave tube according to the present invention.

FIG. 4 is a circuit diagram showing the structure of a power supply apparatus for a traveling wave tube according to the embodiment of the present invention. For simplicity, in FIG. 4, similar portions to those in FIG. 1 are denoted by equal reference numerals.

As shown in FIG. 4, the power supply apparatus comprises DC power supply 1, input filter 2, voltage stabilizing circuit 3, capacitor 4, choke coil 5, switching devices 6 and 7, step-up transformer 18, rectifying circuit 9 and traveling wave tube 10.

Capacitor 4 is used as a charging/discharging means for charging/discharging an output current of voltage stabilizing circuit 3. Choke coil 5 suppresses the fluctuation of the current value of the output current of the voltage stabilizing circuit 3 or of a discharge current of the capacitor 4. Unlike with the step-up transformer 8 in FIG. 1, in the step-up transformer 18, a primary coil and a secondary coil are successively wound around a core.

The capacitor 4 preferably has a low impedance at nearly the on/off switching frequencies of switching devices 6 and 7. In addition, the choke coil 5 preferably has an inductance several times as high as the leakage inductance of the step-up transformer 18. In FIG. 4, the voltage between the terminals of the capacitor 4 is denoted by Vc, whereas the voltage between the terminals of the choke coil 5 is denoted by VL.

DC power supply 1, input filter 2, voltage stabilizing circuit 3, switching devices 6 and 7, rectifying circuit 9 and traveling wave tube 10 have same structure and operation to those in FIG. 1, respectively.

FIGS. 5A, 5B, 5C, 5D, 5E, 5F, 5G, and 5H are time charts showing waveforms of signals of individual portions of the power supply apparatus for the traveling wave tube according to the embodiment of the present invention. Next, with reference to FIGS. 5A to 5H, the operation of the power supply apparatus for the traveling wave tube according to the embodiment will be described. A DC voltage of the DC power supply 1 is supplied to an input filter 2. The input filter 2 eliminates noise from the DC voltage. The resultant DC voltage is applied to the voltage stabilizing circuit 3. The voltage stabilizing circuit 3 primarily stabilizes the input DC voltage and outputs a stabilized DC voltage.

With the output DC voltage, a current flows to the capacitor 4 or the choke coil 5. The current that flows to the capacitor 4 is stored as electric charge. The current that flows to the choke coil 5 is input to a center tap of the step-up transformer 18 through the choke coil 5.

Since the choke coil 5 prevents the current value from varying with the impedance thereof, the maximum value (peak value) of a current iL decreases (as shown in FIG. 5D). In addition, as shown in FIG. SC, counter electromotive force VL is generated between the terminals of the choke coil 5. However, the counter electromotive force VL is limited to equal to or lower than a voltage Vc between the terminals of the capacitor 4. Thus, the counter electromotive force VL does not largely increase.

Next, the source of a current supplied to the center tap of the step-up transformer 18 will be described. When electric charge is stored in the capacitor 4 and thereby the voltage Vc between the terminals of the capacitor 4 becomes higher than the voltage Vi at the center tap of the step-up transformer 18, as shown in FIG. 5B, the capacitor 4 becomes a current source. The capacitor 4 discharges electricity and thereby prevents the voltage of the voltage stabilizing circuit 3 from sharply lowering.

When a current iC discharges and thereby the voltage Vc between the terminals of the capacitor 4 becomes lower than the voltage Vi at the center tap of the step-up transformer 18, as shown in FIG. 5B, the capacitor 4 does not discharge the current iC. In this case, the voltage stabilizing circuit 3 becomes a current source. The waveform of the output DC voltage of the voltage stabilizing circuit 3 is shown in FIG. 5A.

Figure 2A:
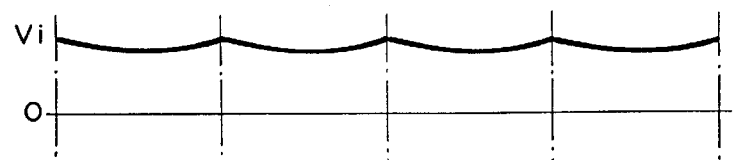
FIGS. 2A, 2B, 2C, 2D, 2E, and 2F are time charts showing waveforms of signals of individual portions of the related art reference shown in FIG. 1.
Figure 2B:
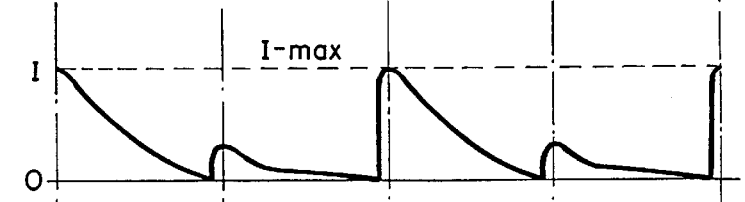
Figure 2C:
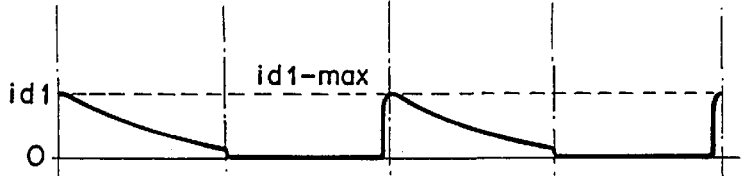
Figure 2D:
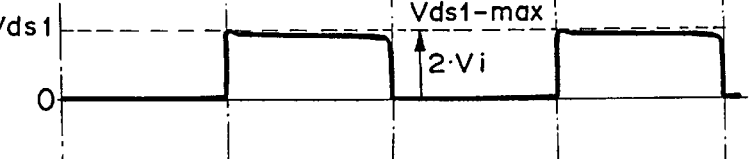
Figure 2E:
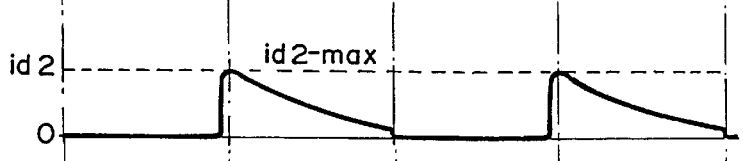

While the current iL is being input to the center tap of the step-up transformer 18, when the switching device 6 is turned on and the switching device 7 is turned off, a current id1 as shown in FIG. 5E flows at the primary side of the step-up transformer 18. As shown in FIG. 5F, the waveform of the voltage Vds1 between the terminals of the switching device 6 is the same as that shown in FIG. 2D.

Figure 2F:
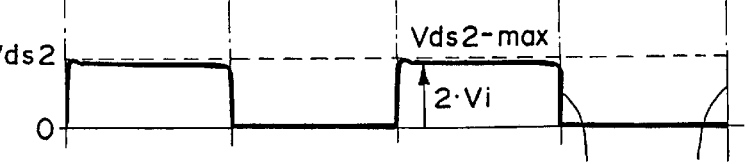
Figures 3A, 3B, 3C:
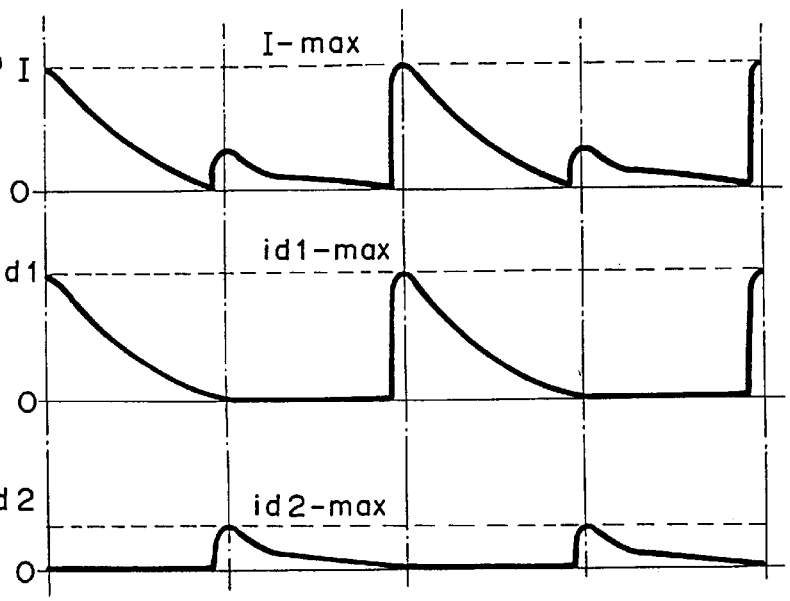
FIGS. 3A, 3B, and 3C are time charts for explaining a disadvantage of the related art reference.

On the other hand, when the switching device 6 is turned off and the switching device 7 is turned on, a current id2 flows through the switching device 7 as shown in FIG. 5G. As shown in FIG. 5H, the voltage Vds2 between the terminals of the switching device 7 is the same as that shown in FIG. 2F.

Next, the theory of which the current id1 and the current id2 becomes the same will be described. When the current id1 that flows through the switching device 6 increases, the voltage Vi at the center tap rises. Thus, the voltage VL of the choke coil 5 as the difference between the output voltage Vc of the voltage stabilizing circuit 3 and the voltage Vi at the center tap of the step-up transformer 18 lowers. As a result, the current iL that is proportional to the voltage VL of the choke coil 5 decreases. Thus, the current id1 that flows through the switching device 6 decreases. This applies to the case that the current id2 that flows through the switching device 7 increases.

The voltage that is induced on the secondary side of the step-up transformer 18 is applied to the rectifying circuit 9. The voltage has a waveform of an AC voltage with the switching operations of the switching devices 6 and 7. Thus, the voltage is applied to the rectifying circuit 9. The rectifying circuit 9 rectifies the voltage. The rectified voltage is applied to a traveling wave tube 10. With the rectified voltage, the traveling wave tube 10 is driven.

According to the above-described embodiment, a power supply apparatus that supplies power to a traveling wave tube was described. However, it should be noted that the present invention is not limited to such an example. In other words, a medium to which power is supplied is not limited to a traveling wave tube. Thus, power can be supplied to various types of semiconductor devices.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

The present invention is a power supply apparatus, comprising a DC power supply, a plurality of switch means for converting the output voltage of the DC power supply into an AC voltage, and a transformer tap-connected to the DC power supply, a primary side of the transformer being connected to the switch means, the AC voltage being output to a secondary side of the transformer, wherein a charging/discharging means for charging/discharging an output current of the DC power supply is connected in series to the DC power supply, and wherein a fluctuation suppressing means for suppressing the fluctuation of the output current of the DC power supply or the fluctuation of the current value of a discharge current of the charging/discharging means.

Thus, a power supply apparatus with a small step-up transformer that allows currents that flow through switching devices to become the same can be provided. Thus, even if the size of the step-up transformer is reduced, the switching noise can be prevented from increasing. In addition, the switching devices can be prevented from being damaged.

What is claimed is:

1. A power supply apparatus comprising:

a DC power supply;

a plurality of switch means for converting the output voltage of said DC power supply into an AC voltage;

a transformer tap-connected to said DC power supply, a primary side of said transformer being connected to said switch means, and the induced voltage of said AC voltage being output to a secondary side of said transformer;

a filter for eliminating noise from the output voltage of said DC power supply, said filter being connected in parallel to said DC power supply;

voltage stabilizing means for stabilizing the output voltage of said DC power supply, said voltage stabilizing means being connected in parallel to said filter;

charging/discharging means for charging/discharging an output current of said DC power supply, said charging/discharging means being connected in parallel to said voltage stabilizing means; and fluctuation suppressing means for suppressing the fluctuation of the output current of said DC power supply or the fluctuation of the current value of a discharge current of said charging/discharging means, said fluctuation suppressing means being connected in series to said voltage stabilizing means.

2. The power supply apparatus as set forth in claim 1, wherein said filter is connected to the primary side of said transformer; said apparatus further comprising:

a rectifier for rectifying said AC voltage induced, wherein said rectifier is connected to the secondary side of said transformer.

3. The power supply apparatus as set forth in claim 2, wherein said transformer is a step-up transformer;

said charging/discharging means is a capacitor;

said fluctuation suppressing means is a choke coil; and said voltage stabilizing means is a boost regulator or a back regulator.

4. The power supply apparatus as set forth in claim 3, wherein the inductance of said choke coil is larger than the leakage inductance of said transformer.

\* \* \* \* \*